June 12, 1951 J. C. LOZIER 2,556,699
AMPLIFIER
Filed May 7, 1948 2 Sheets-Sheet 1
FIG. 1
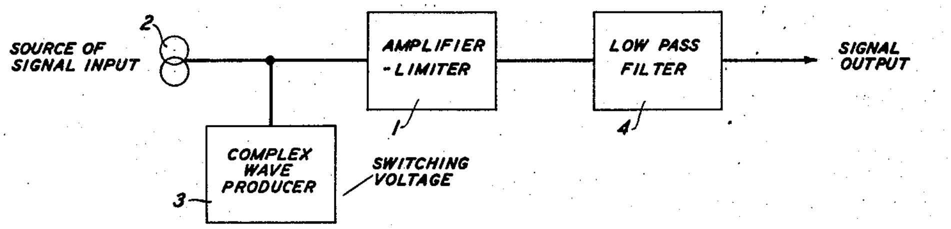
FIG. 2
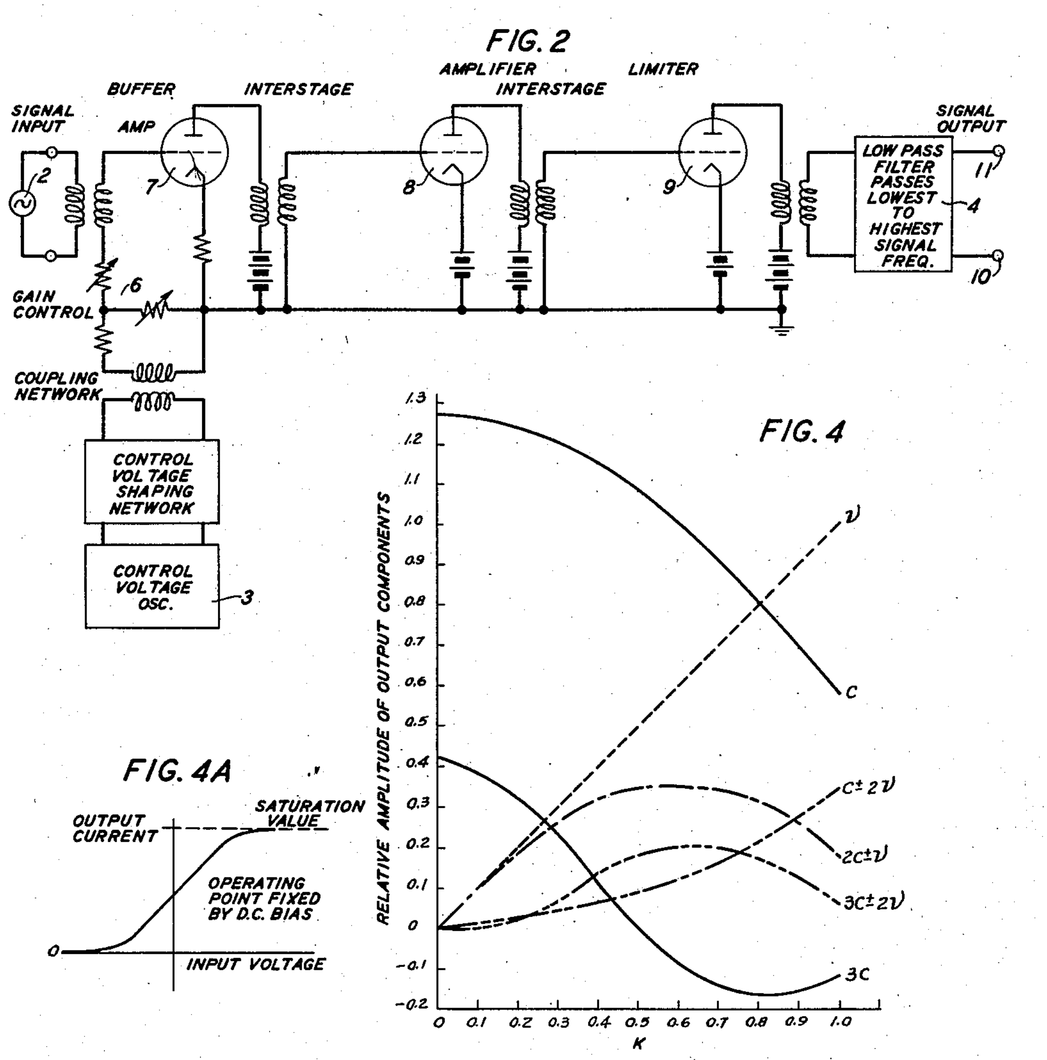
FIG. 4, FIG. 4A
INVENTOR
J. C. LOZIER
BY N. S. Ewing
ATTORNEY June 12, 1951 | J. C. LOZIER | 2,556,699

AMPLIFIER

Filed May 7, 1948 | 2 Sheets-Sheet 2

INVENTOR
J. C. LOZIER
BY
N. S. Ewing
ATTORNEY

Patented June 12, 1951 2,556,699

UNITED STATES PATENT OFFICE

2,556,699

AMPLIFIER

John C. Lozier, Short Hills, N. J., assignor to Bell Telephone Laboratories, Incorporated, New York, N. Y., a corporation of New York Application May 7, 1948, Serial No. 25,600

6 Claims. (Cl. 250—27)

This invention relates to the amplification of electric waves, and it has as principal objectives improved control over the amplifying characteristics of an electric wave amplifier, particularly with regard to non-linear distortion, and improved power handling capacity.

In conventional vacuum tube amplifiers and especially in high power amplifiers, the non-linearity of the operating characteristic limits the output signal power that can be accommodated without excessive signal distortion.

In one aspect of the invention its object is to increase substantially the output signal power from such an amplifier without increased signal distortion.

In another aspect of the invention its object is to provide a signal amplifying system in which the amplifying characteristic, and more particularly the relation between input signal voltage and output signal current, is substantially independent of the shape of the operating characteristic of the vacuum tubes employed.

In accordance with a feature of the invention the aforesaid amplifying characteristic is fixed by the shape of a periodic control wave, which may be made of saw-tooth form, specifically, for linear or distortionless amplification of applied signals.

In a specific embodiment of the invention there is applied to the control circuit of a current relay, such as a high power vacuum tube, a periodic saw-tooth control wave of such high intensity that the current delivered by the relay assumes in periodic alternation two widely different fixed values, e. g., zero and the saturation current of the tube. In the absence of a signal, in other words, the current output of the relay is a square wave of the same frequency as the control wave. A signal of sufficient intensity applied concurrently to the control circuit affects the current output by advancing or retarding, (according to the relative polarity of the signal voltage,) the instants at which the current output switches from one extreme value to the other, the amount $\Delta t$ of advance of retardation being a linear function of the instantaneous signal amplitude $\Delta V$.

The amplifying system is completed by a filter which removes the control frequency aforementioned, its sidebands and harmonics, leaving the amplitude signal frequency components to be passed on to a useful load.

Referring to the figures of the drawing:

Fig. 1 shows the block diagram schematic of an amplifier circuit in accordance with the invention;

Fig. 2 shows the amplifier circuit;

Figs. 4, 4A show explanatory curves.

Figures 3A, 3B, 3C, 3D, 3E, 3F:
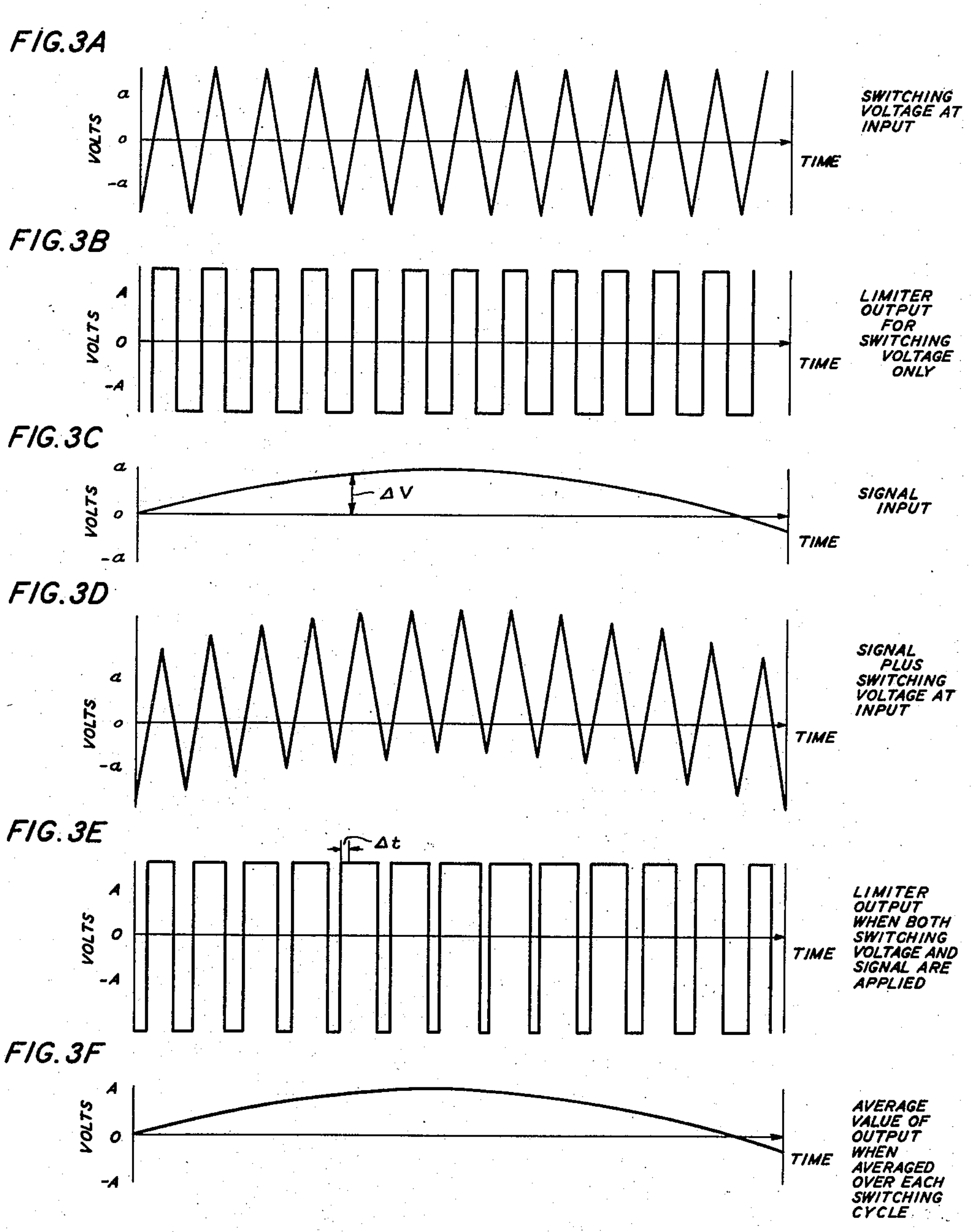
Figs. 3A–3F show explanatory wave shapes involved in the operation of the circuit of Figs. 1 and 2.

Referring to the schematic circuit shown in Fig. 1, the amplifier-limiter 1 may be a tube which obtains its limiting action from saturation by the input signals, or it may be an ordinary amplifier triode which inherently has a saturation value. A source 2 of signals is connected to the input of the amplifier-limiter 1 in the conventional way. A switching voltage of complex wave form, such as a saw-tooth, is applied to the input of amplifier-limiter 1 by the complex wave producer 3 to control the operating characteristics of said amplifier. The slope of the switching wave controls the characteristic of amplifier 1, i. e., the relationship of the input signal amplitude increment $\Delta V$ to the time increment ($\Delta t$) aforementioned. When the switching voltage has a linear time slope, as in the case of a saw-tooth wave, the amplification in amplifier 1 will be linear.

The amplifier-limiter 1 serves to mix the input signal and the switching frequency by a form of modulation, which results in the appearance of components in its output, such as the fundamental signaling frequency $\upsilon$, the switching frequency $c$ and various cross-modulation products of $c$ with $\upsilon$.

The low pass filter 4, which is connected to the output of the amplifier, filters out the undesired switching frequency $c$, its sidebands and harmonics, but passes components having the same fundamental frequency range as the input signal to a useful load as the amplified signal output.

The maximum signal output power is obtained when the peak amplitude of the signal reaches that of the switching voltage at the input to the amplifier. Up to this point the amplification is under control of the switching voltage and beyond it the system is effectively overloaded.

Other forms that the amplifier-limiter may take are arrangements of copper oxide elements, as in circuits for volume compression and expansion, and similar types of limiters of the character known to the art.

The operation of the circuit of Fig. 1 may be better comprehended by considering the explanatory curves of Figs. 3A–3F.

Curve 3A shows a saw-tooth switching voltage, such as is applied to the input of amplifier-limiter 1 by a saw-tooth oscillator.

Curve 3B shows the square-top wave as the output of the amplifier 1, when the saw-tooth switching voltage is applied thereto in the absence of the signal.

Curve 3C shows the signal input, whose frequency and amplitude are lower than those of the switching voltage wave.

Curve 3D shows the form of the input wave when the signal and switching voltage are combined and applied to the amplifier-limiter input. This curve is obtained by the additive composition of curves 3A and 3C.

Fig. 3E shows the output wave from amplifier-limiter 1 corresponding to the combined input wave of Fig. 3D. As shown, the amplifier-limiter output is a square-top wave of variable pulse length when the input has both the signal wave and the switching voltage applied thereto.

Fig. 3F is a curve which shows the output of the low pass filter and it represents the signal component present in the output of the amplifier-limiter as passed by said filter. The recovery of the original signal in amplified form is obvious from the shape of the curve of Fig. 3F as compared to the shape of the input signal (Fig. 3C) and from the relation of ordinate scales A:*a* shown in said figures.

A circuit embodiment in accordance with the invention is shown in Fig. 2, corresponding to the schematic block diagram previously described.

Amplifier 7 comprises a conventional (6SN7) triode to which a source of communication signals, such as telephone, telegraphy, modulated carrier, modulated radio waves, multiplex radio telephone, etc., is applied to the grid thereof. The tube's characteristic is illustrated in Fig. 4A and is characterized by a low or reverse voltage cut-off, a linear rise or slope, and a saturation region. It is desirable to locate the direct current bias midway between the two cut-offs. The switching voltage may be a periodic complex wave form, for example, a saw-tooth wave characterized by a constant rate of change of voltage throughout the cycle of the saw-tooth. The sine wave oscillator 3 provides output waves which are shaped in a shaping circuit of the type utilized in cathode-ray sweep circuits to provide the desired saw-tooth which may be isosceles or right triangular wave form. The switching control voltage is then applied through a transformer coupling to the grid of amplifier 7. A gain control T-network 6 of variable resistors controls the relative amplitudes of signal and switching voltage and thereby the effective gain of the amplifier. The switching voltage should exceed the signal amplitude, and the positive and negative peaks of the switching wave may be of the order of 100 times the value that would be necessary to produce saturation and cut-off, respectively. The frequency of the control oscillator 3 should preferably be at least thrice the signal frequency to avoid the contingency of unwanted modulation products falling in the signaling band.

The output of the amplifier 7 is further amplified in a multistage amplifier, consisting of saturated stages 8 and 9 whereby a constant amplitude wave is produced which is then passed through low pass filter 4, designed to pass the lowest to highest signal frequencies and to reject or absorb the switching frequency. The amplified signal appears at the output leads 10 and 11, to which a useful load may be connected.

At high radio frequencies, it may be found practical to alleviate coupling difficulties by utilizing a single amplifier-limiter tube instead of three as shown.

A harmonic analysis of the output of the limiter will not be made here. However, the results of such an analysis, showing the various output components as a function of $k$ (where $k$ is the ratio of the peak amplitudes of the signal and switching voltages) is plotted in Fig. 4.

Fig. 4 shows the response or output spectrum of an ideal amplifier-limiter to simultaneously applied signal input waves of sine curve form and switching voltage input of isosceles triangle wave form, "$k$" representing the ratio of their respective peak amplitudes.

The curves correspond to the cases of signal frequency $\upsilon$ carrier or switching frequency $c$, and various modulation products thereof $c\pm2\upsilon$, $2c\pm\upsilon$, $3c\pm2\upsilon$, etc. It can also be seen therefrom that the average or signal component (Fig. 3F) varies linearly with $k$. Further data of a similar nature is disclosed in an article by J. C. Lozier, Bell System Technical Journal, vol. 26, pages 360–387, published April 1947.

Thus, this modulating action provides a means of amplification in which the input and output characteristics are controlled by the slope, or time rate of change, of the switching voltage at the input. When the switching voltage has a linear time slope, the amplification is linear.

There are many other useful possibilities. For example, if the time derivative or slope of the switching voltage were proportional to its instantaneous amplitude, instead of being constant, the resulting amplifier would be a 2-to-1 compressor rather than a linear amplifier. Again, if the slope of the switching voltage were inversely proportional to the instantaneous amplitude, the amplifier would be a 2-to-1 expandor.

There are also numerous possibilities for discontinuous input-output characteristics. For example, a square wave plus a saw-tooth could be combined to give a switching voltage that would give the amplifier a threshold. Input signals having amplitudes smaller than the square wave portion of the switching wave could not introduce any time modulation and thus would not be amplified.

By this limiting or modulation action, an amplifier can be made with several advantages over the conventional amplifier. In the first place, more effective use of the load carrying capacity of a given tube may be obtained by driving the tube beyond cut-off at each end. Furthermore, the distortion is less at any input level than that of a conventional amplifier, since its depends on the linearity of the saw-tooth rather than on the tube characteristics. Considerable noise improvement would be achieved thereby, for any noise that is not present in the input circuit does not affect the switching instant and therefore would not appear in the output.

It should be understood that the switching voltage, although disclosed as derived from an external source, may however be supplied by self-oscillation of the amplifier-limiter without departing from the spirit of the invention.

Low frequency amplifiers in the sub-audible range may also be used and linearized in the manner disclosed in accordance with the invention.

What is claimed is:

1. In combination, an electric wave amplifying device having a substantially linear amplification region and the additional operating states of reverse voltage cut off and saturation, a source of communication signals connected thereto, said signals being of sufficient amplitude to drive said amplifying device from said linear region into at least one of said additional states, periodic switching means connected to said device, said means comprising a source of complex waves having positive and negative peak amplitudes sufficiently large to drive said device into each of said operating states alternately, and filter means connected to the output of said device for separating said communication signals from said complex waves.

2. The combination according to claim 1 wherein the slope of said complex waves between said positive and negative peaks is constant, thereby providing linear amplification of said communication signals.

3. The combination according to claim 1 wherein the slope of said complex wave between said positive and negative peaks is proportional to the instantaneous amplitude thereof, thereby providing compressive amplification of said communication signals.

4. The combination according to claim 1 wherein the slope of said complex wave between said positive and negative peaks is inversely proportional to the instantaneous amplitude thereof, thereby providing expansive amplification of said communication signals.

5. In combination, a non-linear electric conduction device having an input circuit and an output circuit, said output circuit having discrete operating states of substantially non-conduction and substantially full conduction therethrough, said input circuit being adapted to control the particular state of conduction in said output circuit, a source of signals connected to said input circuit for substantially linear amplification by said non-linear device, periodic switching means connected to said input circuit to alternately produce said states of non-conduction and conduction respectively at a frequency rate substantially greater than the highest frequency of said signals, said switching means comprising a source of periodic triangularly shaped switching voltage waves connected to said input circuit, said input circuit being adjusted to produce said alternate states in said output circuit at a point intermediate the maximum and minimum values of said voltage waves, and filter means connected in said output circuit for passing said signal and rejecting said switching wave.

6. In an electric wave amplifying system, an amplifier comprising a thermionic discharge device having anode, cathode and control electrodes, an input circuit including said control electrode, and output circuit including said anode, means to bias said control electrode to a value substantially mid-way between reverse voltage cut off and anode current saturation, a source of periodic triangularly shaped switching voltage waves connected to the input circuit of said amplifier, said switching waves being of such magnitude that the current in said output circuit changes abruptly from reversal voltage cut off value to saturation value substantially as the voltage passes through zero, a source of signals connected to the input circuit of said amplifier, said signals having a peak value approximating but not substantially exceeding the peak value of said switching voltage wave, and a filter in the output circuit for selectively transmitting the amplified signal appearing therein.

JOHN C. LOZIER.

REFERENCES CITED

The following references are of record in the file of this patent:

UNITED STATES PATENTS

| Number | Name | Date |
|---|---|---|
| 1,887,237 | Finch | Nov. 8, 1932 |
| 2,061,734 | Kell | Nov. 24, 1936 |
| 2,086,918 | Luck | July 13, 1937 |